US012649158B2

(12) United States Patent
Hepperle et al.

(10) Patent No.: US 12,649,158 B2
(45) Date of Patent: Jun. 9, 2026

(54) ELECTROSTATIC FILTER MODULE FOR AIR CLEANER, AND AIR CLEANER

(71) Applicant: BSH Hausgeräte GmbH, Munich (DE)

(72) Inventors: Georg Hepperle, Heilbronn (DE); Barbara John, Bruchsal (DE); Daniel Vollmar, Pfinztal (DE)

(73) Assignee: BSH Hausgeräte GmbH, Munich (DE)

( * ) Notice: Subject to any disclaimer, the term of this patent is extended or adjusted under 35 U.S.C. 154(b) by 1151 days.

(21) Appl. No.: 17/294,434

(22) PCT Filed: Nov. 28, 2019

(86) PCT No.: PCT/EP2019/082947
§ 371 (c)(1),
(2) Date: May 17, 2021

(87) PCT Pub. No.: WO2020/109489
PCT Pub. Date: Jun. 4, 2020

(65) Prior Publication Data
US 2022/0016643 A1 Jan. 20, 2022

(30) Foreign Application Priority Data
Nov. 30, 2018 (DE) ..................... 10 2018 220 720.8

(51) Int. Cl.
B03C 3/12 (2006.01)
B03C 3/08 (2006.01)
(Continued)

(52) U.S. Cl.
CPC .................. B03C 3/12 (2013.01); B03C 3/08 (2013.01); B03C 3/38 (2013.01); B03C 3/41 (2013.01);
(Continued)

(58) Field of Classification Search
CPC .... B03C 3/12; B03C 3/08; B03C 3/38; B03C 3/41; B03C 3/47; B03C 3/66; B03C 3/82;
(Continued)

(56) References Cited

U.S. PATENT DOCUMENTS 3,785,124 A * 1/1974 Gaylord .................... B03C 3/78
55/DIG. 36
3,980,455 A * 9/1976 Masuda .................... B03C 3/38
361/226
(Continued)

FOREIGN PATENT DOCUMENTS

CN 2350655 Y 11/1999
CN 2507564 Y 8/2002
(Continued)

OTHER PUBLICATIONS

Epo translation of DE2146288 (Year: 1973).*
(Continued)

*Primary Examiner* — Stephen Hobson
(74) *Attorney, Agent, or Firm* — Michael E. Tschupp; Andre Pallapies; Brandon G. Braun

(57) ABSTRACT

An electrostatic filter module for an air cleaner includes a housing having an installation space configured to be sealed at least against ingress of liquid. The installation space has a high-voltage connection and a connection for lower voltage. Arranged in the housing are a separation unit and an ionization unit arranged in the housing, and a high-voltage transformer is accommodated in the installation space of the housing.

18 Claims, 6 Drawing Sheets

(51) Int. Cl.

| | |
|---|---|
| *B03C 3/38* | (2006.01) |
| *B03C 3/41* | (2006.01) |
| *B03C 3/47* | (2006.01) |
| *B03C 3/66* | (2006.01) |
| *B03C 3/82* | (2006.01) |
| *B60H 3/00* | (2006.01) |
| *F24C 15/20* | (2006.01) |
| *F24F 8/192* | (2021.01) |

(52) U.S. Cl.

CPC .................. *B03C 3/47* (2013.01); *B03C 3/66* (2013.01); *B03C 3/82* (2013.01); *B03C 2201/04* (2013.01); *B03C 2201/30* (2013.01); *B60H 3/0078* (2013.01); *F24C 15/2035* (2013.01); *F24F 8/192* (2021.01)

(58) Field of Classification Search

CPC ............ B03C 2201/04; B03C 2201/30; B60H 3/0078; F24C 15/2035; F24F 8/192

See application file for complete search history.

(56) References Cited

U.S. PATENT DOCUMENTS

| | | | | | |
|---|---|---|---|---|---|
| 4,261,712 | A | * | 4/1981 | Kinkade ................... | B03C 3/66 363/142 |
| 4,567,541 | A | * | 1/1986 | Terai ......................... | B03C 3/66 323/903 |
| 4,673,416 | A | * | 6/1987 | Sakakibara ............... | B03C 3/66 96/79 |
| 5,669,963 | A | * | 9/1997 | Horton ...................... | B03C 3/82 96/87 |
| 6,056,808 | A | * | 5/2000 | Krause ...................... | B03C 3/86 96/92 |
| 7,077,890 | B2 | * | 7/2006 | Botvinnik ................. | B03C 3/08 422/186.04 |
| 7,897,118 | B2 | * | 3/2011 | Taylor .................... | B01D 53/32 422/186 |
| 2005/0051028 | A1 | * | 3/2005 | Botvinnik ................. | B03C 3/60 96/88 |
| 2006/0016337 | A1 | * | 1/2006 | Taylor ...................... | B03C 3/08 96/25 |
| 2006/0182672 | A1 | * | 8/2006 | Hallam ................... | A61L 9/015 422/186.07 |
| 2010/0089240 | A1 | * | 4/2010 | Krichtafovitch .... | F24C 15/2035 96/95 |
| 2010/0147151 | A1 | * | 6/2010 | Ji ............................. | B03C 3/47 96/86 |
| 2010/0163012 | A1 | * | 7/2010 | Adar ....................... | F24C 15/20 126/299 D |
| 2011/0185905 | A1 | * | 8/2011 | Ji ............................. | C25B 11/02 204/290.01 |
| 2011/0197768 | A1 | * | 8/2011 | Motegi ..................... | B03C 3/08 96/100 |
| 2014/0076163 | A1 | * | 3/2014 | Hess ........................ | B03C 3/155 96/97 |
| 2017/0120255 | A1 | * | 5/2017 | Cho .......................... | B03C 3/12 |
| 2017/0203305 | A1 | * | 7/2017 | Lee ........................... | B03C 3/38 |
| 2020/0009577 | A1 | * | 1/2020 | Hepperle .................. | B03C 3/47 |
| 2022/0134355 | A1 | * | 5/2022 | Hepperle ............... | B03C 3/155 96/65 |
| 2022/0331815 | A1 | * | 10/2022 | Hepperle .......... | B01D 46/0032 |
| 2022/0339577 | A1 | * | 10/2022 | Hepperle ............... | B03C 3/155 |
| 2022/0339641 | A1 | * | 10/2022 | Hepperle ................. | B03C 3/12 |
| 2024/0044511 | A1 | * | 2/2024 | Heckmann ........... | G08B 17/125 |

FOREIGN PATENT DOCUMENTS

| | | | | | |
|---|---|---|---|---|---|
| CN | 201575513 | U | | 9/2010 | |
| CN | 102188871 | A | | 9/2011 | |
| CN | 105396693 | A | * | 3/2016 | .............. B03C 3/43 |
| CN | 205090456 | U | | 3/2016 | |
| CN | 105562209 | A | * | 5/2016 | .............. B03C 3/41 |
| CN | 106492986 | A | * | 3/2017 | .......... B01D 53/323 |
| CN | 106492991 | A | * | 3/2017 | .............. B03C 3/66 |
| CN | 106944260 | A | * | 7/2017 | .............. B03C 3/32 |
| CN | 106964489 | A | * | 7/2017 | .............. B03C 3/41 |
| CN | 107051724 | A | * | 8/2017 | .............. B03C 3/34 |
| CN | 107115969 | A | * | 9/2017 | .............. B03C 3/47 |
| CN | 107377219 | A | * | 11/2017 | .............. B03C 3/47 |
| DE | 2146288 | | * | 3/1973 | |
| DE | 2146288 | A1 | | 3/1973 | |
| DE | 3618403 | A1 | | 12/1987 | |
| DE | 102012109253 | A1 | | 4/2014 | |
| EP | 2700882 | A2 | | 2/2014 | |
| WO | 2010120072 | A2 | | 10/2010 | |

OTHER PUBLICATIONS

"Transformer" Wikipedia published Oct. 28, 2015 accessed at <https://en.wikipedia.org/w/index.php?title=Transformer&oldid=687971435> (Year: 2015).*

"Potting (electronics)" Wikipedia published Jul. 21, 2015 accessed at <https://en.wikipedia.org/w/index.php?title=Potting_(electronics)&oldid=672473424> (Year: 2015).*

International Search Report PCT/EP2019/082947 dated Mar. 4, 2020.

* cited by examiner

ELECTROSTATIC FILTER MODULE FOR AIR CLEANER, AND AIR CLEANER

CROSS-REFERENCES TO RELATED APPLICATIONS

This application is the U.S. National Stage of International Application No. PCT/EP2019/082947, filed Nov. 28, 2019, which designated the United States and has been published as International Publication No. WO 2020/109489 A1 and which claims the priority of German Patent Application, Serial No. 10 2018 220 720.8, filed Nov. 30, 2018, pursuant to 35 U.S.C. 119(a)-(d).

BACKGROUND OF THE INVENTION

The present invention relates to an electrostatic filter module for an air cleaner and to an air cleaner with at least one electrostatic filter module.

In air cleaners, such as cooker hoods for example, it is known that the flow of air sucked in, instead of being cleaned by mechanical filter elements, can be cleaned by an electrostatic filter, also known as a filter cassette.

In order to make possible an electrostatic separation of particles that are to be found in the air, said particles must first be electrostatically charged. The charging of the particles is also referred to as ionization. Both for the ionization of particles and also for their separation, a high electrical voltage of several thousand volts is needed. In this process both a positive high voltage and a negative high voltage can be used.

A high-voltage transformer is employed for generation of this necessary high electrical voltage. This high-voltage transformer supplies the ionization unit, which can also be referred to as the ionization area, and the separation unit, which can also be referred to as the separation area, of the electrostatic filter cassette with high electrical voltage or with the electrical energy resulting therefrom.

This high-voltage transformer is permanently arranged outside the actual filter cassette in the cooker hood and supplies the electrostatic filter cassette with high electrical voltage via one or more high-voltage cables and contact points. Electromechanical contact points, such as spring contacts can be used here to connect the filter cassette to the high-voltage transformer.

A disadvantage that these air cleaners have is that high-voltage cables, plugs and high-voltage contact points are necessary, which makes for a high outlay in cabling, especially in order to be able to insure safety during the operation of the air cleaner. Moreover the handling of the air cleaner is complex and may possibly be associated with risks.

BRIEF SUMMARY OF THE INVENTION

The object of the present invention is therefore to create a solution by means of which the handling of the air cleaner is simplified and safety during operation and handling of the air cleaner can be guaranteed in a simple way.

In accordance with a first aspect the object is achieved by an electrostatic filter module for an air cleaner, which has a housing, at least one separation unit and at least one ionization unit, which are arranged in the housing. The electrostatic filter module is characterized in that the filter module has at least one high-voltage transformer, that the housing has an installation space for the at least one high-voltage transformer, that the installation space has at least one high-voltage connection and at least one connection for lower voltage, that the high-voltage transformer is accommodated in the installation space of the housing, and that the installation space is at least sealed against the ingress of liquid.

A module that can be inserted into an air cleaner and via which the air is cleaned by electrostatically charging of particles and a separation of the charged particles is referred to as an electrostatic filter module for an air cleaner. The electrostatic filter module will also be referred to below as a filter module or filter cassette. The filter module represents a portable filter element which is pre-assembled and can be removed from the air cleaner. A filter module that is inserted into the air cleaner as a unit and can be removed from the air cleaner in a unit is referred to as pre-assembled filter module.

The filter module has a housing, at least one separation unit and at least one ionization unit, which are arranged in the housing. The separation unit is connected downstream from the ionization unit in the direction of flow. The ionization unit preferably has at least one emission electrode, which will also be referred to below as the ionization element, and at least one counter electrode. The separation unit has at least one positive collection electrode and at least one grounded collection electrode. The ionization element has high voltage applied to it. When contaminated air flows through ionization unit solid and liquid substances, which are also referred to as particles, are electrostatically charged by means of the ionization element. The separation unit comprises at least one positive collection electrode and at least one grounded collection electrode, which are preferably designed in the form of plates and are arranged alternately in the separation unit. The positive collection electrodes of the separation unit likewise have high voltage applied to them. The charged particles separate because of their charge and the field embodied between the electrodes of the separation unit at the collection electrode or electrodes.

The housing preferably has an air inlet and an air outlet. In accordance with one form of embodiment the housing represents a frame, which is open at opposite sides. The separation unit and the ionization unit are arranged in the housing. In particular the electrodes of the units are arranged in the housing. To this end an accommodation space is preferably embodied for the electrodes in the housing.

An apparatus in which at least one filter module is arranged and which has a fan or can be linked to a fan in such a way that a flow of air is guided through at the at least one filter module is referred to as an air cleaner.

The electrostatic filter module is characterized in that the filter module has at least one high-voltage transformer, the housing has an installation space for at least the high-voltage transformer, which has at least one high-voltage connection and at least one connection for lower voltage, the high-voltage transformer is accommodated in the installation space of the housing and the installation space is sealed at least against the ingress of liquid.

The high-voltage transformer can also be referred to as a high-voltage generator, high-voltage power supply or ionizator. The high-voltage transformer serves in particular to create the high voltage (>1000 V) necessary for the separation unit and ionization unit from extra-low voltage or low voltage. The high-voltage transformer especially has a primary side, to which the extra-low voltage or low voltage is applied, and a secondary side, via which the high voltage generated from the applied extra-low voltage ($\leq 50$V AC, $\leq 120$V DC) or low voltage ($\leq 1000$V AC, $\leq 1500$V DC) is output. A corresponding circuit can be provided for this purpose in the high-voltage transformer for example. The circuit can have a transformer for example.

The high-voltage transformer is integrated into the electrostatic filter module. To this end the housing has an installation space for at least the high-voltage transformer. The high-voltage transformer is accommodated in the installation space. In addition further components, in particular electrically-conducting connection elements, can also be accommodated in the installation space. The installation space has at least one high-voltage connection and at least one connection for lower voltage. A connection via which extra-low voltage or low voltage can be applied is referred to as a connection for lower voltage.

The installation space is at least sealed against the ingress of liquid. Moreover the installation space is preferably also sealed against the ingress of particles. Over and above this the installation space can also be airtight. A part of the housing that represents a closed-off space is referred to as the installation space. The installation space is preferably arranged so that it is adjacent to the separation unit and the ionization unit. In accordance with a form of embodiment the installation space extends over the entire height and depth of the housing. The installation space can have an insertion opening, via which the high-voltage transformer can be inserted into the installation space and connected there. The insertion opening can then be closed off after the connection of the high-voltage transformer by a door or a plate. The sealing of the installation space is achieved here for example by sealing material at the edge of the insertion opening.

The fact that a high-voltage transformer is integrated into the filter module in accordance with the invention enables a series of advantages to be obtained. In particular it is no longer necessary to lay high-voltage cables to the air cleaner itself. This considerably reduces the cabling outlay. Also high-voltage connectors and high-voltage contact points are no longer necessary on the air cleaner. This means that there cannot be any dangerous short circuits and flashovers at plug connectors. Also the probability of failure of the cable insulation caused by material fatigue does not have to be taken into account here. Advantages from the EMC (electromagnetic compatibility) standpoint are also produced, since long high-voltage cables laid in the air cleaner can lead to electromagnetic faults. The assembly complexity of the filter is also lower, because no individual high-voltage parts have to be built into the housing of the cooker hood, which require specific installation steps. This produces a cost advantage because material costs are saved by the omission of expensive high-voltage cables, plug connectors and specific high-voltage contact points. Moreover there is a saving in installation space in the air cleaner, because experience has shown that high-voltage lines/cables, connectors and contacts have to be dimensioned larger, in order to take account of electrical air and creepage gaps as per standards. If a defect occurs in the high-voltage transformer and this no longer functions, only the respective filter module with the defective high-voltage transformer has to be replaced. Repairing the air cleaner is not necessary. This brings advantages with it in respect of repair and customer service.

In that, in accordance with the invention, the high-voltage transformer is moreover accommodated in an installation space of the housing of the filter module, wherein the installation space has at least one high-voltage connection and at least one connection for lower voltage, and the installation space is sealed at least against the ingress of liquid, the high-voltage transformer is able to be contacted from outside the installation space and especially supplied with low voltage and the high-voltage transformer is completely protected from dirt, moisture and ingress of water. Moreover the high-voltage outputs of the high-voltage transformer as well as the inputs for lower voltages of the high-voltage transformer are protected from dirt, moisture and ingress of water. Connection elements that are provided between the high-voltage transformer and the connections in the installation space preferably lie within the installation space. This means that the inventive filter module can be washed after being removed from the air cleaner without the high-voltage transformer having to be taken off, or the high-voltage transformer or the connection elements being damaged or contamination collecting on said elements.

In accordance with a preferred embodiment the installation space is filled with a filler material, especially a casting compound. The filler material can preferably be resin, especially polyurethane resin (UR) or polybutadiene. As an alternative the filler material can preferably be a casting compound based on silicon. Furthermore it is possible to use an epoxy resin casting compound as the filler material. The filler material is introduced into the installation space after the high-voltage transformer has been inserted and connected in said space. The high-voltage transformer is thus inseparably joined to the filter module. In this form of embodiment a separate door or plate to close off the insertion opening can be omitted. The integrated and molded-in high-voltage transformer is protected against moisture and contamination by being molded in with filler material and can thus be cleaned in a dishwasher or with running water along with the removable filter module. Moreover the danger of possible electric creepage paths, short circuits and spark flashovers is suppressed by the filler material. Moreover the position of the molded-in high-voltage transformer is defined by the filler material and any accidental slippage and possibly separation of connections can be prevented.

Preferably the installation space in the interior of the housing is arranged so that said space adjoins at least one side wall of the housing of the filter module and at least an accommodation space for electrodes of the separation unit and/or of the ionization unit. Through this position it is possible to make contact with the high-voltage transformer arranged in the installation space. In particular said transformer can be supplied with extra-low or low voltage in a simple way and high voltage can be applied in a simple and reliable way to the electrodes of the separation unit and/or the ionization unit.

In accordance with one form of embodiment at least one connection element for conducting high voltage lies in the installation space between the high-voltage transformer and one of the at least one high-voltage connections and at least one electrical connection element for lower voltages lies between the high-voltage transformer and at least one of the connections for lower voltage. The connection element for conducting high voltage can be a high-voltage cable. The connection element for conducting lower voltages can be a cable for extra-low or low voltage. Moreover at least one connection element, which represents a return line, is accommodated in the installation space. The return line serves to connect the at least one negative or grounded collection electrode of the separation unit to the at least one counter electrode of the ionization unit. The connection between the connection elements and the connections on the walls of the installation space can be made via clamps for example. The fact that the high-voltage transformer is not directly connected to the high-voltage terminal, i.e. it rests against it, enables the high-voltage transformer to be connected in a simple manner to more than one high-voltage connection. Moreover the provision of connection elements in the installation space enables there to be flexibility in choosing the size of the high-voltage transformer and/or of the installation space.

The connection for lower voltage can be an electromechanical contact or inductive connection.

In accordance with a preferred embodiment a contactless, inductive power supply is used in order to supply the high-voltage transformer with extra-low or low voltage. Power can be supplied in this case through the wall of the installation space and especially a wall of the housing. In this form of embodiment the connection for lower voltages is an inductive connection, in the form of a coil for example, in the interior of the installation space. By using an inductive power supply for the high-voltage transformer electromechanical contact points are no longer needed as the interface between the air cleaner and the filter module. Elements subject to wear, such as contacts/connectors for extra-low and low voltage are omitted in this form of embodiment. The construction of the filter module and especially its handling is thus further simplified.

In the form of embodiment in which the connection for lower voltage represents an electromechanical contact, this connection preferably lies at least in some areas on the outer side of the installation space and especially on the outer side of the housing of the filter module. The connection can be formed by a spring contact or by a battery contact, for example. The connection or the connections can be located in such cases on the upper or lower side, the front or rear side or the side sections of the housing of the filter module. Electromechanical connections can also be referred to as contact points.

The fact that the connections are provided on the outer side of the installation space enables power for the high-voltage transformer to be supplied from outside the installation space and especially from outside the housing of the filter module. In particular with an electromechanical connection the required contact on insertion of the filter module into the air cleaner can be established by a corresponding mating piece on the air cleaner. Therefore special cabling or connection of the high-voltage transformer in some other way is not required. Said transformer is instead automatically supplied with power after being inserted into the air cleaner.

In accordance with a form of embodiment the at least one high-voltage connection also lies at least in some areas on the outer side of the installation space of the filter module. Preferably the high-voltage connection protrudes through a wall of the installation space. Preferably the outer side of the installation space through which the high-voltage connection protrudes faces towards the accommodation space of the electrodes of the separation unit and/or the accommodation space of the electrodes of the ionization unit.

The installation space can, in accordance with one form of embodiment, have at least one high-voltage connection and a return connection. The high-voltage connection or connections are arranged in the installation space so that these are preferably directly adjacent to at least one of the electrodes of the separation unit and the ionization unit.

On the secondary side, i.e. the high-voltage side of the high-voltage transformer, two variants are possible as regards making contact with the ionization and separation area.

In accordance with one form of embodiment the high-voltage transformer has an output on the secondary side and this output is connected to a high-voltage connection, wherein the ionization elements of the ionization unit and the positive collection electrodes of the separation unit are connected to the high-voltage connection. In this form of embodiment only one high-voltage output is used, which supplies the ionization area and the separation area with just one electrical voltage, which is of the same amount. Moreover a return of the secondary side, via which the counter electrodes of the ionization unit and the negative collection electrodes of the separation unit are connected, is provided. The return lines do not have to represent high-voltage cables.

In accordance with a further form of embodiment the high-voltage transformer has two outputs on the secondary side and each of the outputs is connected to one of the high-voltage connections, wherein the ionization elements of the ionization unit are connected to the one high-voltage connection and the positive collection electrodes of the separation unit are connected to the second high-voltage connection. The two high-voltage connections differ in their electrical power value. In this form of embodiment the ionization unit and the separation unit are supplied with different amounts of power. Moreover, with this form of embodiment, a return of the secondary side, via which the counter electrodes of the ionization unit and the negative collection electrodes of the separation unit are connected, is provided. The return lines do not have to represent high-voltage cables.

In accordance with a further aspect the invention relates to an air cleaner. The air cleaner is characterized in that it has at least one inventive electrostatic filter module. The filter module or modules are preferably arranged in the area of the inlet opening of the air cleaner, via which the air is sucked into the air cleaner. If for example the air cleaner represents a cooker hood, the filter module or modules are preferably arranged in the vicinity of the suction opening. If a number of filter modules are provided, these can be arranged in parallel or in series with one another in the direction of flow.

Advantages and features that apply with regard to the electrostatic filter module—where applicable—apply accordingly to the inventive air cleaner and vice versa.

Preferably the air cleaner has at least one connection to link it to the connection for lower voltage on the filter module. The connection can represent an electromechanical contact. As an alternative the connection on the air cleaner can be an inductive connection and in particular represent a coil. With an electromechanical contact the connection can represent a spring contact, for example, which in the inserted state of the filter module into the air cleaner rests with a contact against an electromechanical connection on the filter module.

The air cleaner can be an extractor, in particular a cooker hood, for the kitchen. With these air cleaners, on account of the steam and vapors that are to be cleaned by them, frequent cleaning of the filter module is required. Therefore, with such air cleaners in particular, the advantages of the present invention can particularly be used. Since the high-voltage transformer is integrated into the filter module, this can be inserted into the cooker hood and removed from the hood again in a simple way. In accordance with an alternate example the air cleaner represents a room air cleaner. This can be employed in private rooms or in public rooms. With these air cleaners too special use can be made of the advantages of the present invention. Also with these air cleaners on the one hand frequent cleaning of the filter module is required. On the other hand, with these air cleaners too, the filter modules are as a rule replaced by the user. Thus the fact that the user does not have to handle any high-voltage connections when inserting and removing the filter module increases safety during the handling of the filter module. In accordance with a further alternative the air cleaner can also be an air cleaner for a motor vehicle. With this form of embodiment too use can be made of the advantages of the invention. In particular since the high-voltage transformer is accommodated in a hermetically sealed installation space, this enables reliable protection against liquids to be given even in the harsh environment of a motor vehicle and thereby its safe operation to be guaranteed.

BRIEF DESCRIPTION OF THE DRAWINGS

The present invention will be explained in greater detail once again with regard to the enclosed drawings. In the figures.

DETAILED DESCRIPTION OF EXEMPLARY EMBODIMENTS OF THE PRESENT INVENTION

Figure 1:
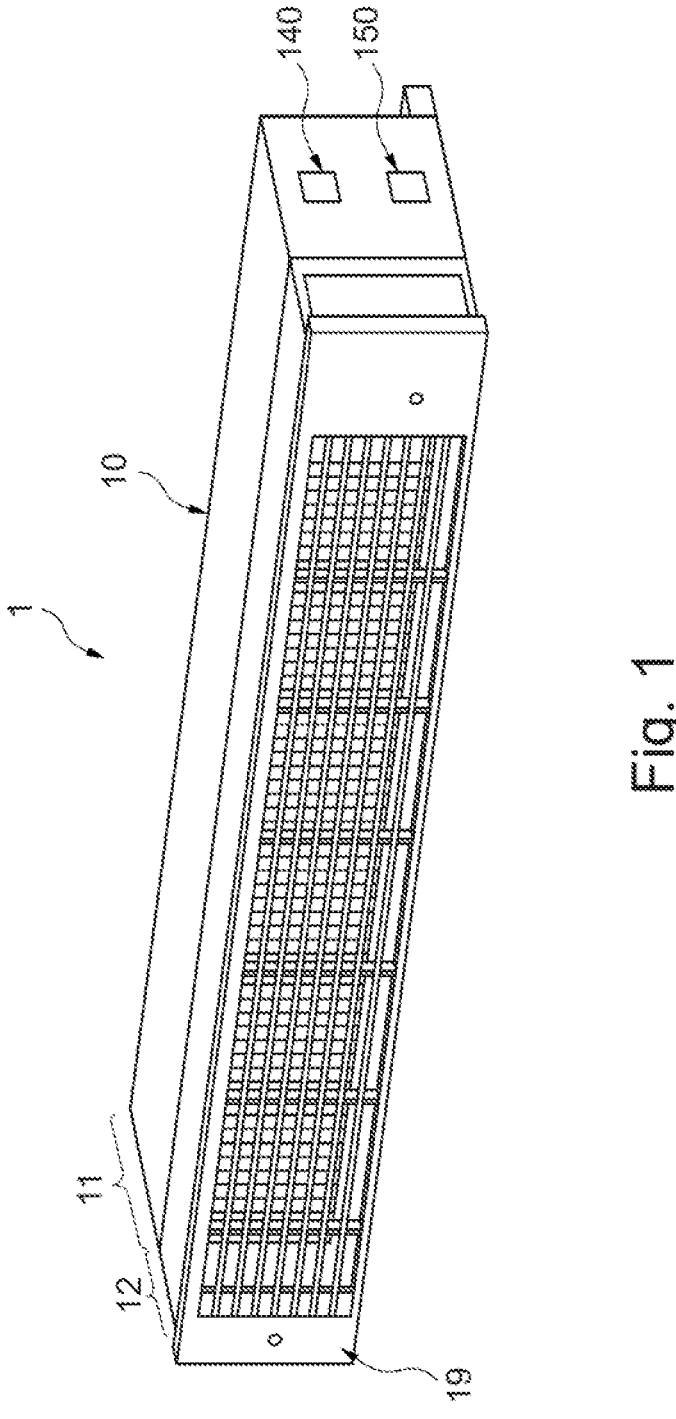
FIG. 1 shows a schematic perspective view of a form of embodiment of the inventive filter module.

FIG. 1 shows a schematic perspective view of a form of embodiment of the inventive filter module 1. The filter module 1 has a separation unit 11 and an ionization unit 12. In the form of embodiment shown the separation unit 11 and the ionization unit 12 are arranged in separate parts of the housing, which together form the housing 10. The inlet side of the ionization unit 12 is covered by a protective grid 19. The outlet side of the ionization unit 12 adjoins the separation unit 11. The ionization unit 12 is arranged in front of the separation unit 11 in the direction of flow, meaning that during operation the flow passes through it first.

In the form of embodiment shown there are contacts 140, 150 provided on the housing 10 in the area of the separation unit 11. These contacts 140, 150 lie on the outside of the housing 10. Extra-low voltage or low voltage can be applied via the contacts 140, 150.

In the form of embodiment shown the filter module 1 has a box shape, wherein the width is greater than the depth and height of the filter module 1. However it also lies within the framework of the invention for the dimensions of the filter module 1 or its shape to differ from the form of embodiment shown.

Figure 2:
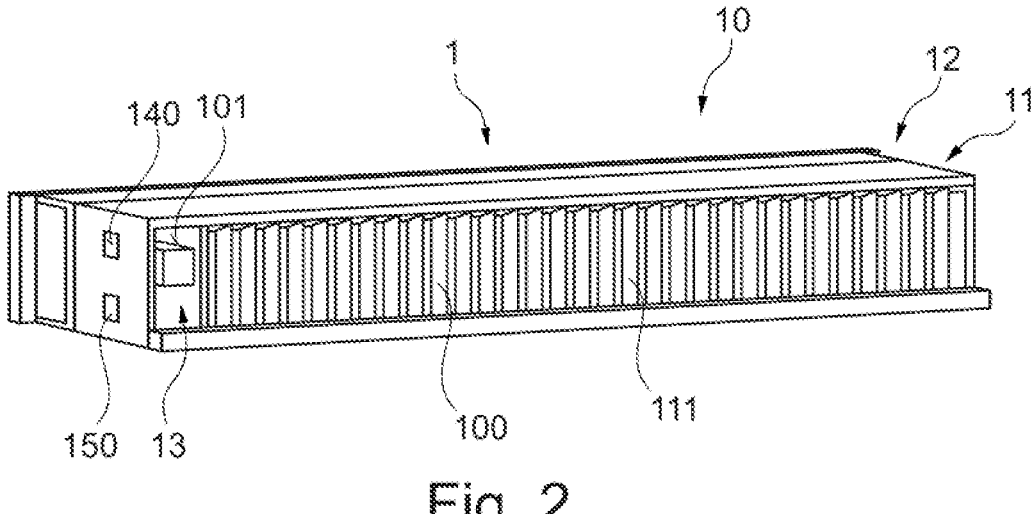
FIG. 2 shows a schematic perspective rear view of the form of embodiment according to FIG. 1.
Figure 3:
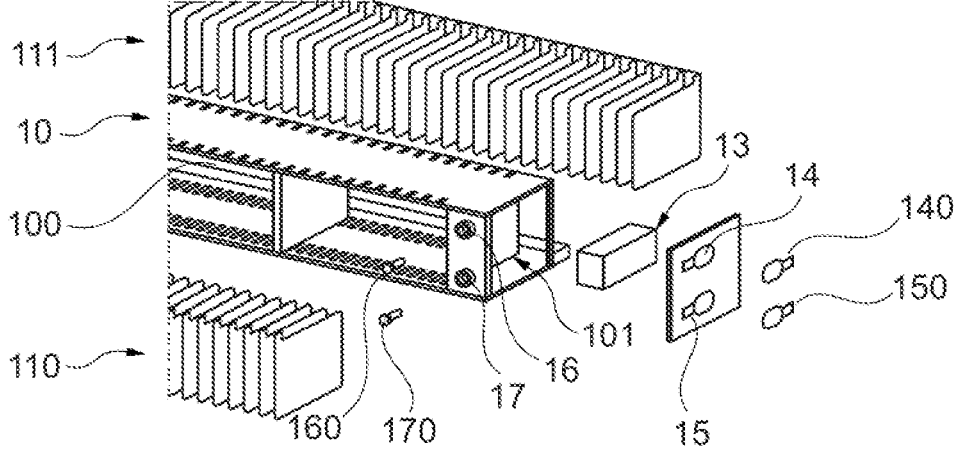
FIG. 3 shows a schematic perspective exploded diagram of the separation unit according to FIG. 1.

Shown in FIG. 2 is a schematic perspective rear view of the filter module 1 according to FIG. 1. FIG. 3 shows an exploded view of the separation unit 11 of this form of embodiment of the filter module 1. An accommodation space 100 is embodied in the housing 10 of the filter module 1. Arranged in this accommodation space 100 are the positive collection electrodes 110 and the negative collection electrodes 111, which are also referred to as grounded collection electrodes, of the separation unit 11. A corresponding accommodation space (not visible) is formed in the housing 10 for the electrodes of the ionization unit 12. Plate-shaped electrodes represent the positive collection electrodes 110 and negative collection electrodes 111 and are arranged alternately in the separation unit 11.

Moreover an installation space 101 is formed in the housing 10. The installation space 101, in the form of embodiment shown, lies to the side adjacent to the accommodation space 100 for the positive collection electrodes 110 and the negative collection electrodes 111 of the separation unit 11. The size of the installation space 101 is small compared to the accommodation space 100. Moreover the installation space 101, in the form of embodiment shown, only extends over the part of the housing in which the separation unit 11 lies. The accommodation space 100 for the electrodes of the ionization unit 12 can therefore be wider than the accommodation space 100 for the electrodes of the separation unit 11. A high-voltage transformer 13 is accommodated in the installation space 101. The contacts 140, 150 are arranged on the outer side wall of the installation space 101, which represents a side wall of the housing 100.

As emerges from FIG. 3, the outer side wall of the installation space 101, which represents a side wall of the housing 10, in the form of embodiment shown, is a separate plate that is connected to the housing 10, for example glued or welded to it. Connections 14, 15 for application of a lower voltage, especially an extra-low voltage or low voltage, are provided on the side wall of the housing 10. These can lie on the inner side of the installation space or in the side wall. The contacts 140, 150 are attached to these connections 14, 15. Moreover a high-voltage connection 16 and also a connection 17 for the negative collection electrodes 111 and counter electrodes 121 (see FIGS. 6 and 7) are provided in a wall of the installation space 101, which faces towards the accommodation space 100 or the housing 10. In the form of embodiment shown the high-voltage connection 16 and the connection 17 of the negative collection electrodes 11 and counter electrodes 121 lie on the front side of the installation space 101, i.e. on the side that faces towards the ionization unit 12. However it also lies within the framework of invention for the high-voltage contact 16 and the connection 17 of the negative collection electrodes 111 and counter electrodes 121 or additional contacts (not shown) to lie on the side wall of the installation space 101, which lies opposite the side wall on which the connections 14, 15 for the lower voltage lie, i.e. in the form of embodiment shown, faces towards the accommodation space 100 for the electrodes of the separation unit 11.

Contacts 160, 170 can be connected to the connections 16, 17, via which the connections 16, 17 can be connected to the electrodes of the separation unit 11 and the ionization unit 12.

The connections 14, 15, 16, 17 are connected to the high-voltage transformer 13 via connection elements (not shown), which are especially represented by cables.

As an alternative to the form of embodiment shown in FIGS. 1 to 3, in which electromechanical contacts 140, 150 are provided for the supply of the high-voltage transformer 13 with lower voltage, the power supply can also represent an inductive power supply. In this form of embodiment the connections 14, 15 are formed as coils on the inner side of the installation space 101.

Figures 4, 5:
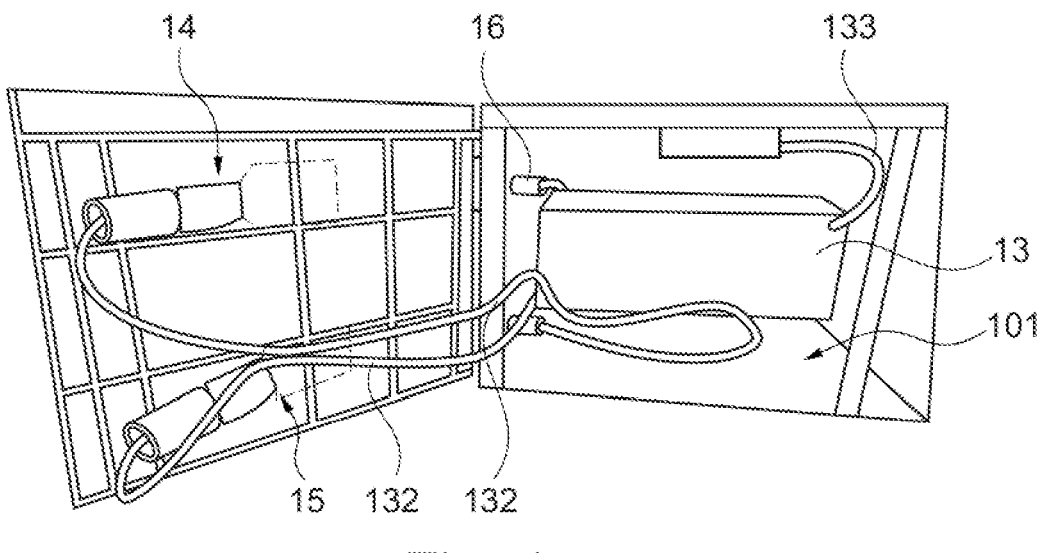
FIG. 4 shows a schematic view of an opened installation space of a further form of embodiment of the filter module.
FIG. 5 shows a schematic front view of the form of embodiment according to FIG. 4.

Shown in FIGS. 4 and 5 is a further form of embodiment of the inventive filter module 1. This form of embodiment has essentially the same structure as the filter module 1 shown in FIGS. 1 to 3. However in this form of embodiment the side wall of the housing 10, in which the connections 14, 15 are provided, is attached pivotably to the housing 10. Moreover the connection elements that lie in the installation space 101 are also shown in FIG. 4. In particular connection elements 132 in the form of cables are shown in FIG. 4, which connect the connections 14, 15 on the side wall of the installation space 101 to the high-voltage transmitter 13, especially to the primary side of the high-voltage transmitter 13. Moreover the high-voltage connection element 133 in the form of a high-voltage cable is shown, which connects the high-voltage transmitter 13 to the high-voltage connection 16.

The connection 17 not visible in FIG. 4 represents both the connection for the negative collection electrode 11 and also for the counter electrode 121. The connection between the high-voltage transformer 13 and the contact is therefore not absolutely embodied as a high-voltage cable.

The installation space 101, in the form of embodiments shown, is open to the rear side when the filter module 1 is assembled. During the assembly the installation space 101 is preferably filled with a filler material 2. In particular the high-voltage transformer 13 is molded-in after the connection of the connections 14, 15, 16 17 in the installation space 101. In the assembled state the installation space 101 is completely filled with filler material 2 in this case, which is shown schematically in FIG. 5. As an alternative however the rear side of the installation space 101 can also be closed. In this case the rear side can be formed by a further separate side wall (not shown), which closes off the open side of the installation space 101 after assembly. The rear wall can be connected to the installation space 101 by gluing or welding for example. However it also lies within the framework of the invention for the installation space 101 to have only one open side during assembly, said open side representing an insertion opening, via which the high-voltage transformer 13 and the connection elements 132, 133 are inserted and connected. This open side can be closed off by the side wall during assembly of the filter module 1. A seal can be provided on the contact surface between the side wall and the housing 10. Thus the installation space is hermetically sealed at least against liquids in this form of embodiment too.

Figure 6:
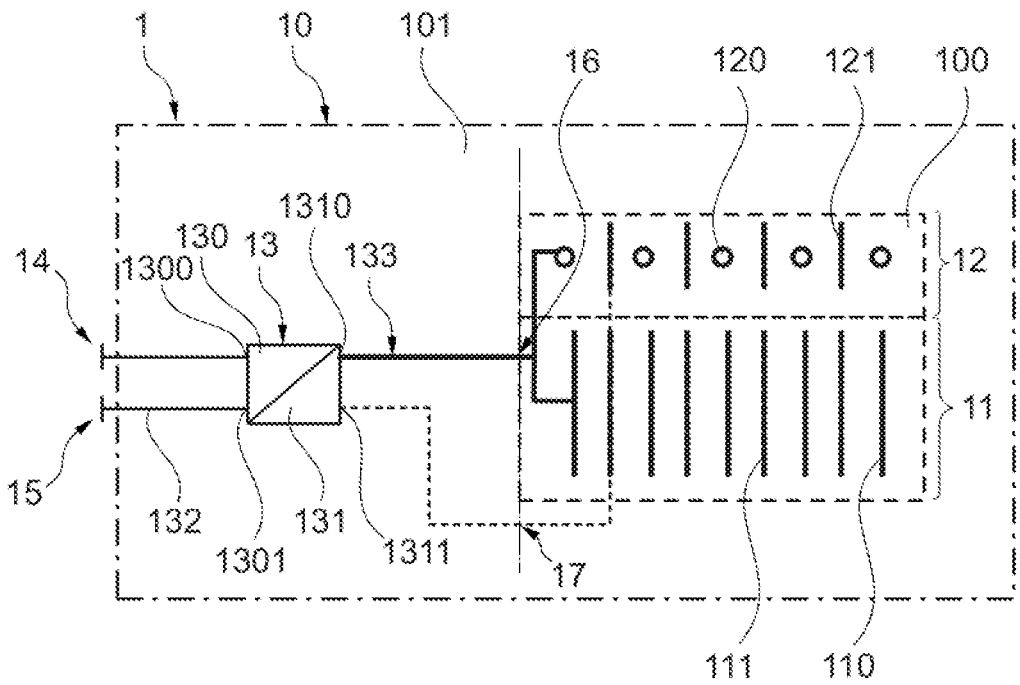
FIG. 6 shows a schematic basic diagram of a form of embodiment of the inventive filter module.

FIG. 6 shows a basic diagram of a form of embodiment of the inventive filter module 1. Provided on the housing 10 are connections 14, 15 for lower voltages. These are connected via connection elements 132 to the high-voltage transformer 13, in particular the connection elements 132 are connected to inputs 1300, 1301 on the primary side 130 of the high-voltage transformer 13. In the high-voltage transformer 13 the lower voltage is transformed into high voltage. This high voltage is output via outputs 1310, 1311 on the secondary side 131 of the high-voltage transformer 13. The outputs 1310, 1311 are connected via connection elements 133 to a high-voltage connection 16 and the return connection 17. The high-voltage transformer 13 and the connection elements 132, 133 lie in the installation space 101 of the housing 10. Via the high-voltage connection 16 the positive collection electrodes 110 of the separation unit 11 and the ionization elements 120, which are also referred to as emission electrodes, of the ionization unit 12 are supplied with high voltage, i.e. high voltage is applied to the electrodes. The return of the secondary side occurs via the connection 17, to which the counter electrodes 121 of the ionization unit 12 and the negative collection electrodes 111 of the separation unit 11 are connected. The electrodes of the separation unit 11, in the form of embodiment shown, represent plate-shaped positive collection electrodes 110 and plate-shaped negative collection electrodes 111, which are arranged alternately. The electrodes of the ionization unit 12, in the form of embodiment shown, are wire-shaped ionization elements 120 and plate-shaped counter electrodes 121, which are arranged alternately.

In the form of embodiment according to FIG. 6 the high-voltage connection 16 is connected to the output 1310 of the high-voltage transformer 13. The high-voltage connection 16 in its turn is connected via a branch to the positive collection electrodes 110 and the counter electrodes 120. This means that the separation unit 11 and the ionization unit 12 are operated in this form of embodiment with a high voltage of the same amount.

The connection 17 for the counter electrodes 121 and the negative collection electrodes 111 is connected to the output 1311 of the high-voltage transformer 13 and forms the return line on the high-voltage side, i.e. secondary side of the high-voltage transformer 13. The connection 17 is connected to the negative or grounded collection electrode 111 and the counter electrode 210.

Figure 7:
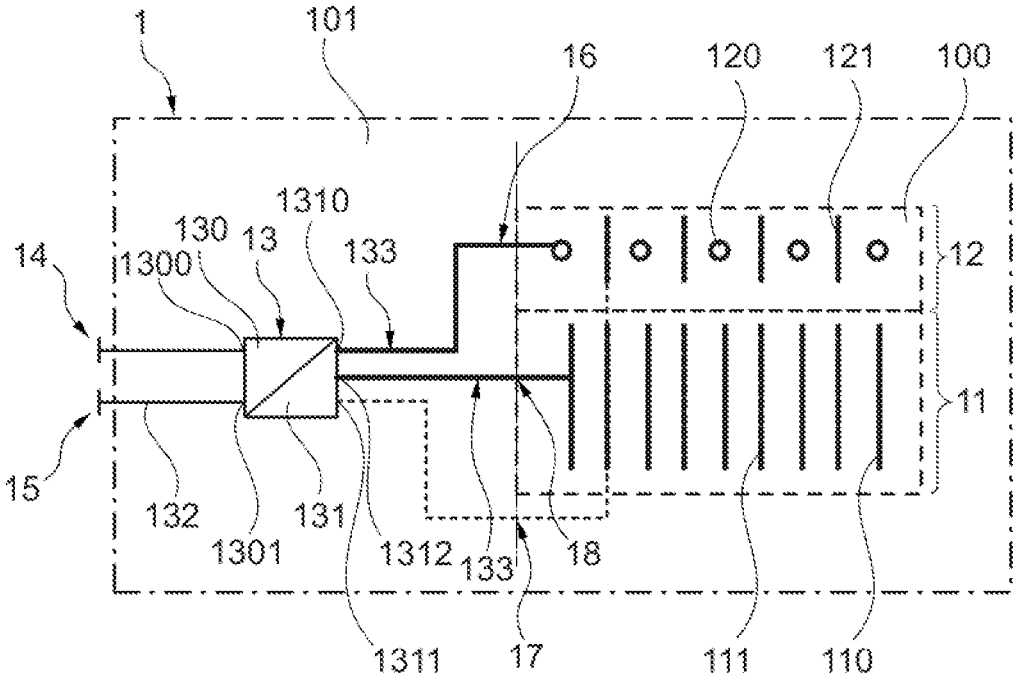
FIG. 7 shows a schematic basic diagram of a further form of embodiment of the inventive filter module.

Shown in FIG. 7 is a basic diagram of a further form of embodiment of the filter module 1. This form of embodiment merely differs from the form of embodiment shown in FIG. 6 in that three outputs 1310, 1311, 1312 are provided on the high-voltage transformer 13 and three connections 16, 17 and 18 are provided. The connection 16 is connected in this form of embodiment to the ionization elements 120 of the ionization unit 12 and the connection 18 to the positive collection electrodes 110 of the separation unit 11 and supplies these with high voltage. This enables the high voltage that is applied to the positive collection electrodes 110 of the separation unit 11 to differ from the amount of high voltage that is applied to the ionization elements 120 of the ionization unit 12. In this form of embodiment too the negative collection electrodes 111 and the counter electrodes 121 are connected to the connection 17.

Figure 8:
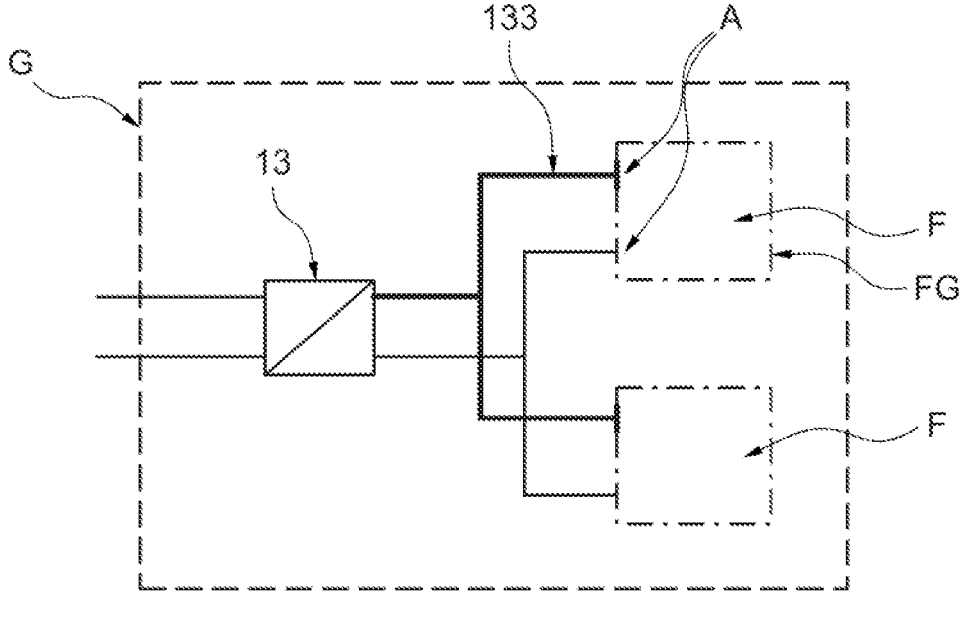
FIG. 8 shows a schematic basic diagram of a form of embodiment of an air cleaner according to the prior art.

Finally, in FIG. 8, a basic diagram of an air cleaner is shown. Arranged in the housing G of the air cleaner here are two removable electrostatic filter cassettes F. Here the high-voltage transformer 13 is permanently installed in the housing G of the air cleaner. The high-voltage transformer 13 supplies the removable filter cassettes F via one or more high-voltage cables 133. Two connections A are provided for this purpose on the filter cassettes F, which each represent electromechanical contact points, such as spring contacts for example. The electromechanical contact points are necessary here to the extent that the filter cassettes F have to be removed from the housing G of the air cleaner after a certain operating time for cleaning. For this reason the electrical cables/lines 133 of the secondary side of the high-voltage transformer 13 are not permanently connected mechanically and electrically to the filter cassette F.

In the present invention on the other hand the high-voltage transformer is implemented in the filter module and is accordingly integrated into said module. If the implementation of the high-voltage transformer is carried out in accordance with the invention, a number of advantages are produced for using an electrostatic filter module. In particular in accordance with the invention, an electrostatic filter module, which can also be referred to as a filter cassette, with integrated high-voltage transformer is provided. The high-voltage transformer can also be referred to as a high-voltage generator, high-voltage power supply or ionizator. In this case the high-voltage transformer is integrated into the removable and preferably cleanable filter module. The electrostatic filter module can vary in its geometrical dimensions, such as width, height, depth as well as the embodiment with or without a protective grid. The filter module or modules are employed for example in an extractor hood, in particular a cooker hood for the kitchen, a room air cleaner, or in a receptacle for the interior filter of an automobile or are removed for cleaning. In such cases the high-voltage transformer does not sit permanently built into the housing of the cooker hood, the air cleaner or separately in the engine bay of the car, directly and immediately in the removable filter module. The power is supplied to the high-voltage transformer via contact points for example, which are located on the outside of the filter module housing. The power is supplied to the primary side of the high-voltage transformer for example as extra-low voltage (<=50V AC; <=120V DC) or low voltage (<=1000V AC; <=1500V DC). As an alternative there can be a contactless, inductive power supply through the filter module housing. In the filter module the necessary installation space for implementation is provided for the high-voltage transformer.

The present invention has a series of advantages.

Through the integration of the high-voltage transformer into the actual filter cassette/filter module, high-voltage cables, connectors and high-voltage contact points are no longer needed in the air cleaner. In this case no high-voltage cables to the respective filter module(s) have to be laid through the air cleaner. The cabling outlay is therefore restricted to a minimum. Moreover cabling of the high-voltage transformer is no longer required in the air cleaner. This enables dangerous short circuits and flashovers at plug connectors to be avoided. Also a likelihood of failure of the cable insulation caused by material fatigue does not need to be considered. Through the restriction of the high voltage on the filter module itself, potential dangers of faulty high voltage are reduced. From the EMC (electromagnetic compatibility) standpoint there are likewise advantages, since long high-voltage cables laid in the air cleaner can lead to electromagnetic faults, but said cables are not required in the present invention.

The complexity of installing the filter module in the air cleaner also falls, because no individual high-voltage parts have to be built into the housing of the air cleaner, which require specific assembly steps. These measures lead to a cost advantage because omission of expensive high-voltage cables, connectors and special high-voltage contact points in the air cleaner enable material costs to be saved. Moreover the filter modules can be integrated extremely flexibly into different designs or target devices, meaning air cleaners. In particular it is possible to have a concept that is as independent and modular as possible, whereby accordingly the required filter power, the number of components and their arrangement can be scaled and adapted. Each filter module, through its integrated high-voltage unit, is able to be flexibly replaced and, within specific parameters, can be varied flexibly in its geometry.

Moreover a saving in installation space can be made in the air cleaner, since experience has shown that high-voltage lines/cables, connectors and contacts can be dimensioned larger in order to take account of electrical air and creepage gaps as per standards and these now do not have to be provided separately in the air cleaner. Furthermore the use of an inductive power supply for the high-voltage transformer is possible on the primary side, whereby no electromechanical contact points are needed any longer as the interface between air cleaner and filter module. Elements subject to wear, such as contacts/connectors for extra-low and low voltage are omitted in the preferred form of embodiment.

The preferably complete molding of the high-voltage transformer into the housing of the filter module means that said transformer with its high-voltage outputs is completely protected against dirt, moisture and water ingress. If a fault develops in the high-voltage transformer and the unit no longer functions, then only the respective filter module with the defective high-voltage transformer has to be replaced. It is not necessary to repair the air cleaner. This brings with it further advantages in respect of repair and customer service.

The invention claimed is:

1. An electrostatic filter module for an air cleaner, said electrostatic filter module comprising:
  a housing having an installation space configured to be sealed at least against ingress of liquid, said installation space having a high-voltage connection and a connection for lower voltage;
  a separator arranged in the housing;
  an ionizer arranged in the housing; and
  a high-voltage transformer accommodated in the installation space of the housing,
  wherein the housing is configured to include an accommodation space for electrodes of the separator and/or of the ionizer,
  said installation space is in an interior of the housing, is a separate area from the accommodation space, and adjoins a side wall of the housing and a side wall of the accommodation space.

2. The electrostatic filter module of claim 1, further comprising a filler material filled in the installation space.

3. The electrostatic filter module of claim 2, wherein the filler material is a casting compound.

4. The electrostatic filter module of claim 1, further comprising a connection element arranged in the installation space and configured to conduct high voltage between the high-voltage transformer and the high-voltage connection, and an electrical connection element for lower voltages arranged between the high-voltage transformer and the connection for lower voltage.

5. The electrostatic filter module of claim 1, wherein the connection for low voltage represents at least one of an electromechanical contact and an inductive connection.

6. The electrostatic filter module of claim 1, wherein the connection for low voltage and the high-voltage connection lie at least in one area on an outer side of the installation space of the housing.

7. The electrostatic filter module of claim 1, wherein the high-voltage transformer includes an output on a secondary side, which output is connected to the high-voltage connection, with ionization elements of the ionizer and positive collection electrodes of the separator being connected to the high-voltage connection.

8. The electrostatic filter module of claim 1, further comprising a further said high-voltage connection, said high-voltage transformer including two outputs on a secondary side, with one of the two outputs being connected to the high-voltage connection and the other one of the two outputs being connected to the further high-voltage connection, wherein the ionizer includes ionization elements which are connected to the high-voltage connection, and wherein the separator includes positive collection electrodes which are connected to the further high-voltage connection.

9. An air cleaner, comprising an electrostatic filter module, said electrostatic filter module comprising:
  a housing having an installation space configured to be sealed at least against ingress of liquid, said installation space having a high-voltage connection and a connection for lower voltage;

a separator arranged in the housing;

an ionizer arranged in the housing; and a high-voltage transformer accommodated in the installation space of the housing, wherein the housing is configured to include an accommodation space for electrodes of the separator and/or of the ionizer, said installation space is in an interior of the housing, is a separate area from the accommodation space, and adjoins a side wall of the housing and a side wall of the accommodation space.

10. The air cleaner of claim 9, wherein the electrostatic filler module includes a filler material, especially a casting compound, filled in the installation space.

11. The air cleaner of claim 9, wherein the electrostatic filler module includes a connection element arranged in the installation space and configured to conduct high voltage between the high-voltage transformer and the high-voltage connection, and an electrical connection element for lower voltages arranged between the high-voltage transformer and the connection for lower voltage.

12. The air cleaner of claim 9, wherein the connection for low voltage represents an electromechanical contact or an inductive connection.

13. The air cleaner of claim 9, wherein the connection for low voltage and the high-voltage connection lie at least in one area on an outer side of the installation space of the housing.

14. The air cleaner of claim 9, wherein the high-voltage transformer includes an output on a secondary side, which output is connected to the high-voltage connection, with ionization elements of the ionizer and positive collection electrodes of the separator being connected to the high-voltage connection.

15. The air cleaner of claim 9, wherein the electrostatic filter module includes a further said high-voltage connection, said high-voltage transformer including two outputs on a secondary side, with one of the two outputs being connected to the high-voltage connection and the other one of the two outputs being connected to the further high-voltage connection, wherein the ionizer includes ionization elements which are connected to the high-voltage connection, and wherein the separator includes positive collection electrodes which are connected to the further high-voltage connection.

16. The air cleaner of claim 9, further comprising a connection for joining to the connection for lower voltage of the electrostatic filter module.

17. The air cleaner of claim 16, wherein the connection for joining to the connection for lower voltage of the electrostatic filter module represents an inductive connection.

18. The air cleaner of claim 9, constructed in the form of a cooker hood, a room air cleaner or an internal air cleaner in a motor vehicle.

* * * * *